(12) United States Patent
Hendrikus Machielse et al.

(10) Patent No.: US 7,157,113 B2
(45) Date of Patent: Jan. 2, 2007

(54) METHOD FOR ENCAPSULATION OF AN INORGANIC COMPONENT IN A WAX, A WAX PARTICLE PREPARED BY THE METHOD AND THE USE THEREOF

(75) Inventors: Johannes Bernardus Hendrikus Machielse, Amsterdam (NL); Jan Steenbergen, Wapenveld (NL)

(73) Assignee: BYK-Cera B.V., En Deventer (NL)

( * ) Notice: Subject to any disclaimer, the term of this patent is extended or adjusted under 35 U.S.C. 154(b) by 197 days.

(21) Appl. No.: 10/486,581

(22) PCT Filed: Jul. 22, 2002

(86) PCT No.: PCT/NL02/00492

§ 371 (c)(1),
(2), (4) Date: Jul. 2, 2004

(87) PCT Pub. No.: WO03/016410

PCT Pub. Date: Feb. 27, 2003

(65) Prior Publication Data

US 2004/0234769 A1     Nov. 25, 2004

(30) Foreign Application Priority Data

Aug. 13, 2001    (NL)    .................................... 1018742

(51) Int. Cl.
*B05D 7/24*    (2006.01)
(52) U.S. Cl. ...................................... 427/215; 427/220
(58) Field of Classification Search ................ 427/215, 427/220

See application file for complete search history.

(56) References Cited

U.S. PATENT DOCUMENTS

| | | | | |
|---|---|---|---|---|
| 4,041,115 | A | 8/1977 | Jenkins et al. | .................. 264/5 |
| 4,173,492 | A | 11/1979 | Pollard | .................... 106/308 F |
| 4,471,080 | A | 9/1984 | Rinaldi et al. | ............... 523/205 |
| 5,200,236 | A * | 4/1993 | Lang et al. | .................. 427/213 |
| 5,215,854 | A * | 6/1993 | Yamazaki et al. | ..... 430/137.11 |
| 5,230,822 | A * | 7/1993 | Kamel et al. | ............... 510/370 |
| 6,419,982 | B1 * | 7/2002 | Sacripante et al. | ......... 427/220 |

FOREIGN PATENT DOCUMENTS

EP    0 026 091    4/1981

* cited by examiner

*Primary Examiner*—H. Thi Le
(74) *Attorney, Agent, or Firm*—Roberts & Roberts, LLP

(57) ABSTRACT

The present invention relates to a method for encapsulating an inorganic component in a wax, wherein the method comprises the following steps: i) subjecting the inorganic component to shearing forces such that deagglomeration of the inorganic component takes place, which step is carried out in the presence of the wax, with the wax functioning as a spacer to prevent reagglomeration, ii) subsequently increasing the temperature of the mixture from step i) to a value above the melting temperature of the wax, iii) quickly cooling the mixture obtained in step ii), and finally iv) reducing the solidified mixture from step iii) so as to obtain a wax comprising an inorganic component. The invention further relates to a wax particle obtained by the method and to the use of such wax particles in water-based protection systems.

15 Claims, No Drawings

METHOD FOR ENCAPSULATION OF AN INORGANIC COMPONENT IN A WAX, A WAX PARTICLE PREPARED BY THE METHOD AND THE USE THEREOF

The present invention relates to a method for encapsulating an inorganic component in a wax and to a wax additive related thereto, in which an inorganic component is homogeneously dispersed in the wax particle. The present invention further relates to methods for preparing a micronised wax and a wax dispersion, using such a wax particle, and as well as to the use of such a wax dispersion and micronised wax.

The method referred to in the introduction is known per se from U.S. Pat. No. 4,173,492, in which hydrophilic color pigment particles are mixed with hydroxystearate wax by feeding the pigment particles and the wax to a pair of heated, rotating rolls. Thus, the amount of moisture that may be present in the pigment particles is expelled and the wax is caused to melt, as a result of which the pigment particles are encapsulated so as to obtain a mixture of molten wax and pigment particles. The mixture thus passed through the rotating rolls is subsequently cooled by contacting the mixture with a surface having a low temperature, after which the solid, congealed mass is scraped off the surface and subsequently broken into flakes. From said US patent it is further known that the preferred amount of pigment is 30 to 75 wt. % and the preferred amount of wax is 70 to 25 wt. %, and that glass fibres, metal fibres and other fibres may be added for reinforcement.

Environmental considerations and legislation relating to working conditions have led to significant developments and growth in the field of water-based permanent or temporary protection systems, such as paint or polish. Wax additives are added to said water-based protection systems for the purpose of improving and controlling the surface properties, such as the scratch resistance, the protection against damage, the surface tension, the water repellence, the degree of tackiness, the matting and the smoothness of the surface. As regards wax additives, two types are known, viz. wax emulsions having an average particle size of less than 1 µm, in particular 40–500 nm, and wax dispersions and micronised waxes having a particle size of more than 1 µm, in particular 2–50 µm. The first group of wax additives is used in water-based protection systems, whilst the other group, because of their greater average particle size, is mainly preferred in surface protection and surface matting support applications.

The problem involved in using wax dispersions and micronised waxes is that their relatively great particle size and their low density renders them unstable in water-based protection systems. During storage, the wax additive floats to the surface in the water-based protection system, which effect is inter alia influenced by the type of binding agent, the viscosity of the system and the storage temperature. As a result of said floating, the wax additives will coagulate, and some degree of shrinkage will take place at the interface between the air and the liquid. As a result of said floatation and the related shrinkage of the wax additive, the protection system will exhibit some degree of inhomogeneity. As a result of said coagulation and inhomogeneity, the protection system comprising a wax additive no longer meets the specified requirements, and thus said coagulation and inhomogeneity will lead to undesirable variations in the layer thickness and the degree of gloss and, moreover, serious, visually discernible defects will occur at the surface.

Generally, experts in this field will use combinations of waxes, chemical modification of waxes, binding agents, polymers, such as polytetrafluoroethylene (PTFE), emulgators, thickening agents and other additives to improve the stability of wax dispersions and micronised wax additives in water-based protection systems. Such measures are only suitable for improving the effect and the stability of this group of wax additives in specific embodiments, they have appeared to be unable to ensure long-term stability. For a specific group of waxes, in particular low-density waxes, such as polypropylene waxes, it is nearly impossible, however, to obtain such long-term stability, whilst such stability is desirable with a view to achieving the desired properties of said waxes. In practice, the use of polytetrafluorethylene is seen as a solution, but it leads to a separation of the wax additive into a light fraction and a heavy fraction when applied.

Consequently, the object of the present invention is to obtain long-term stability independently of the temperature and the binding agent, wherein it is desirable to increase the density of the wax to a value higher than or equal to that of the binding agent. Said stability is inherent and permanent in water-based protection systems.

According to the present invention, the method as referred to in the introduction is characterized in that the method comprises the following steps:

i) subjecting the inorganic component to shearing forces such that deagglomeration of the inorganic component takes place, which step is carried out in the presence of the wax, with the wax functioning as a spacer to prevent reagglomeration, ii) subsequently increasing the temperature of the mixture from step i) to a value above the melting temperature of the wax, iii) quickly cooling the mixture obtained in step ii), and finally iv) reducing the solidified mixture from step iii) so as to obtain a wax comprising an inorganic component.

The wax obtained in step iv) can in particular be considered to be a wax particle having a size of about 1–2 mm, which wax particle is also referred to as a "flake".

According to the present invention, a high-density inorganic pigment or filler is used so as to increase the density of the wax, with the amount of inorganic component in the wax matrix being low, in particular 1–5 vol. %. Carrying out the above steps i)–ii) makes it possible to disperse the inorganic component in the molten wax matrix in a homogeneous manner, with the wax functioning as a spacer between the inorganic components in a non-molten condition, thus preventing reagglomeration of the inorganic components. It is necessary to deagglomerate the inorganic component in the wax as described in step i), because it is technically complicated to generate sufficient shearing forces in a molten low-viscosity wax so as to achieve a sufficient degree of deagglomeration of the inorganic component. A micronised or dispersed wax additive having a particle size of more than 1 µm can be obtained from the weighted wax thus obtained. The use of this wax additive, in particular for the water-based protection systems such as paint, polish of lacquer, will lead to long-term stability.

It is in particular preferred to carry out steps i)–ii) in one and the same device, preferably an extruder, with the intruder comprising a cooled zone and a heated zone, in which cooled zone in particular step i) is carried out. It is in particular desirable for the heated zone of the extruder to comprise a temperature gradient with a starting temperature corresponding to room temperature and an end temperature corresponding to the temperature set in step ii).

Using the aforesaid extruder, which extruder comprises a special screw geometry, it is possible to incorporate large quantities by weight of inorganic component in the wax matrix in a homogeneous manner and, and in addition, to achieve a high production rate.

The mixture from step ii) is quickly cooled by pouring it on a cooling belt, so that the inorganic components will remain homogeneously distributed in the wax matrix.

In order to obtain a manageable form, it is preferred to reduce the large solidified plates from step iii) into small particles having a particle size of about 1–2 mm, also called flakes, in step iv). Such flakes can subsequently be subjected to a micronisation treatment with air in an air jet mill, with the wax particle being reduced to a size of 1–50 μm, which reduced wax particle is also referred to as a micronised wax particle. It should be noted in this connection that it is possible to compose a final wax dispersion from the flakes as well as from the micronised wax.

It is also possible, however, to carry out step i) in a device in which high shearing forces can be generated, in particular a dissolver, after which step ii) is carried out in another device, in which the temperature is raised to a value above the melting point of the wax while stirring.

According to such an embodiment, the inorganic component is dispersed in the solid wax, and sufficiently high shearing forces must be exerted for the purpose of deagglomerating the inorganic component into so-called primary particles, in which the wax functions as a barrier and thus prevents reagglomeration. As already said before, the generation of sufficiently high shearing forces in a low-viscosity wax, thus causing deagglomeration of the inorganic component, is technically complicated. Deagglomeration needs to be carried out in the solid phase, therefore.

The inorganic component is selected from the group of metal oxides, in particular titanium dioxide, zinc white, sulphates, silicates, carbonates and silicas, or a combination thereof, and in particular barium sulphate is used as the inorganic component.

Barium sulphate is in particular preferred because of its low colouring power, its low oil absorption number and its high density, in particular a density of 4.4 g/cm$^3$ and an oil absorption number of 9–20 g of oil per 100 g of barium sulphate.

In a particularly preferred embodiment, the density of the inorganic component ranges from 2 to 4.4 g/cm$^3$.

A suitable wax may be: a synthetic wax, such as polyethylene, polypropylene or Fischer-Tropsch waxes, whether or not chemically modified, a semi-synthetic wax, such as amid waxes and montane waxes, or a natural wax, such as bee wax and carnauba wax, or a combination thereof.

Step i) may be carried out in the presence of one or more additional components selected from the group of polymers and resins, preferably polytetrafluorethylene, polyureum polymers or ureumformaldehyde condensates, since these substances already have a high density.

The present invention further relates to a wax particle, or the micronised formed thereof, in which an inorganic component is dispersed, with the amount of inorganic component ranging from 1 to 5% by volume, based on the volume of the weighted wax particle, which inorganic component is homogeneously distributed in the wax matrix. In particular, the spacing between the inorganic components in the wax matrix varies between 0.5 and 2.5 μm. In a specially preferred embodiment, the size of the wax particle ranges from 1 to 50 μm, and the density of the wax particle that is eventually obtained ranges from 1.0 to 1.4 g/cm$^3$.

The present invention furthermore relates to a method for preparing a wax dispersion, using the present wax particle or the micronised form thereof, in which the wax particle or the micronised form thereof is ground in the presence of one or more components selected from the group of water, resins, solvents, co-solvents and additives so as to form the wax dispersion.

The present invention will be explained in more detail hereinafter by means of a number of examples; it should be noted, however, that said examples are merely given by way of explanation and should not be construed as limiting the present invention in any way.

EXAMPLE 1

A Fischer-Tropsch wax having a melting point of about 95° C. is mixed in a quantity by weight of 87 wt. % with barium sulphate in a quantity by weight of 13 wt. %. These two components are mixed in an extruder and subsequently extruded In a co-rotating double screw extruder. The temperature setting of the extruder is such that the first zone is cooled and the second zone is subsequently heated in steps to a temperature of 120° C. The mixture thus extruded at a temperature of about 120° C. is poured into a cooled roll, after which plates of said wax are pressed, which plates are subsequently ground into particles having a size of about 1 mm. The product thus reduced is micronised with air in an air jet mill to form a wax additive having an average particle size of about 7 μm. The wax additive thus prepared is homogeneously weighted and does not exhibit any separation in the application of water-based protection systems.

EXAMPLE 2

A Fischer-Tropsch wax having a melting point of about 95° C. is mixed in a quantity by weight of 69.6 wt. % with barium sulphate in a quantity by weight of 10.4 wt. % and polyureum polymer in a quantity by weight of 20 wt. %. These three components are extruded in a co-rotating double screw extruder and processed further as described in Example 1. The basic wax thus obtained is ground in combination with water, additives and co-solvents on a ball mill to form a wax dispersion having an average particle size of about 5 μm. The obtained wax additive is homogeneously weighted and does not exhibit any separation in the application as mentioned in Example 1.

EXAMPLE 3

A Fischer-Tropsch wax having a melting point of about 95° C. is mixed in a quantity by weight of 78.3 wt. % with barium sulphate in a quantity by weight of 11.7 wt. % and polyureum polymer in a quantity by weight of 10 wt. %. Extrusion takes place in a co-rotating double screw extruder at a temperature of 120° C., and the mixture is further processed as described in Example 1. The wax additive is homogeneously weighted and does not exhibit any separation in the application as mentioned in Example 1.

EXAMPLE 4

A Fischer-Tropsch wax having a melting point of about 95° C. is mixed in a quantity by weight of 78.3 wt. % with barium sulphate in a quantity by weight of 11.7 wt. % and PFTE polymer in a quantity by weight of 10 wt. %. Extrusion takes place in a co-rotating double screw extruder at a temperature of 120° C., after which the operations as described in Example 1 are carried out. The wax additive is homogeneously weighted and does not exhibit any separation in the application as mentioned in Example 3.

EXAMPLE 5

A quantity of 168 g of polypropylene wax having a melting point of 160° C. is mixed with 32 g of barium sulphate and extruded in a co-rotating double screw extruder at a temperature of 170° C., after which the operations as described in Example 1 are carried out. The wax additive is homogeneously weighted and does not exhibit any separation in the application as mentioned in Example 1.

EXAMPLE 6

A quantity of 20 g of polyethylene wax having a melting point of 130° C. is mixed with 154 g of a Fischer-Tropsch wax and 26 g of barium sulphate. This mixture is dispersed for 10 minutes in a dissolver, during which time no melting of the waxes occurs. Subsequently the mixture is melted at a temperature of 140° C. and finally poured on a cold surface. The plates thus obtained are reduced and processed further as described in Example 1. The wax additive is homogeneously weighted and does not exhibit any separation.

EXAMPLE 7

The wax additive of Example 1 was compared with the wax additives that are commercially available at the moment. The tests were carried out in a standard, water-based lacquer with a base of acrylate. The wax additives were added to the lacquer as solid matter in an amount of 2% of the total formulation. The samples were applied on the contrast chart having a wet layer thickness of 120 μm. The stability test was carried out at 40° C. for only 1 week, after which differences were already perceptible. The density of the lacquer is about 1.04 g/cm$^3$. The results included in the following table clearly show that the wax additive according to the present invention exhibits a significantly improved behaviour in comparison with the additives that are currently commercially available.

COMPARATIVE EXAMPLE 1

A quantity of 176 g of polyethylene wax having a melting point of about 130° C. is heated to a temperature of 140° C. Subsequently, 24 g of barium sulphate are added to the thus molten polyethylene wax while stirring at 2000 revolutions per minute. It can be clearly seen that barium sulphate disperses to an insufficient degree in the molten wax, and thus remains behind in the agglomerated form. After further processing of the obtained mixture as described in Example 1, a final separation in the application, like a water based protection system is observed between the low-density particles, which floats to the surface, and the high-density particles, which sediment to a significant degree. From this comparative example it follows that homogeneous weighting is not achieved if the inorganic component is dispersed directly in the molten wax.

The invention claim is:

1. A method for encapsulating an inorganic component in a wax, which comprises the following steps:
   i) subjecting an inorganic component to shearing forces such that deagglomeration of the inorganic component takes place, which subjecting is carried out in the presence of a wax to form a mixture of the inorganic component and the wax, with the wax functioning as a spacer to prevent reagglomeration of the inorganic component,
   ii) subsequently increasing the temperature of the mixture from step i) to a value above the melting temperature of the wax,
   iii) quickly cooling outside the extruder the mixture obtained in step ii), and
   iv) reducing the solidified mixture from step iii) so as to obtain a wax comprising an inorganic component, wherein steps i)–ii) are carried out in an extruder, with

TABLE

| Type of additive | Soft feel Manual | Scratch resistance | Capability of being worked in | Stability test Separation 1 week 40° C. | Applied after homogenisation and storage |
| --- | --- | --- | --- | --- | --- |
| According to Example 1 | 2 | OK | OK | Slight sedimentation | OK |
| Formaldehyde polymer | 4 | Rejected | OK | Slight sedimentation | OK |
| Silica | 3 | Rejected | OK | Formation of bottom sediment | OK |
| A* | 5 | Rejected | OK | Floatation | OK |
| B* | 5 | Rejected | OK | Floatation | OK |
| C* | 5- | Rejected | OK | Floatation | Points |
| D* | 5- | Rejected | Rejected | Separation into light and heavy particles; floating and sedimentation | Many points, difficult to work in |
| E* | 5- | Rejected | OK | Floatation | Points |

Assessment: 1 = very good; 5 poor.
Remarks:
A = Aquapoly 250 (modified polyethylene with emulgators), Micropowders Inc., New York, USA.
B = Ceridust 3715 (micronised oxidated polyethylene wax), Clariant GmbH, Gersthofen, Germany.
C = Ceridust 5551 (micronised montane wax), Clariant.
D = Aquapolyfluo 411 (mixture of Fischer-Tropsch with PTFE and emulgator), Micropowders.
E = Lanco PEW 1555 (Fischer-Tropsch wax with emultgator), Lubrizol, Ritterhude, Germany.

the extruder comprising a cooled zone and a heated zone, in which cooled zone step i) is carried out.

2. The method according to claim 1, wherein a heated zone of the extruder comprises a temperature gradient with a starting temperature corresponding to room temperature and an end temperature corresponding to the temperature set in step ii).

3. The method according to claim 1 wherein the inorganic component is selected from the group of metal oxides, zinc white, sulfates, silicates, carbonates, silicas, and combinations thereof.

4. The method according to claim 3, wherein the inorganic component comprises barium sulfate.

5. The method according to claim 1 wherein the density of the inorganic component ranges from 2 to 4.49/cm$^3$.

6. The method according to claim 1 wherein the wax is a synthetic wax, whether or not chemically modified, a semi-synthetic wax, a natural wax, or a combination thereof.

7. The method according to claim 1 wherein step i) is carried out in the presence of one or more additional components selected from the group of polymers and resins.

8. The method according claim 1 wherein after step iv), the reduced mixture is subjected to a micronisation treatment with air in an air jet mill, with a micronised wax particle being obtained.

9. The method according to claim 1 wherein the inorganic component comprises titanium dioxide.

10. The method according to claim 1 wherein the wax comprises a polyethylene wax, a polypropylene wax, a Fischer-Tropsch wax, whether or not chemically modified, an amide wax, a montane wax, bees wax, carnauba wax, or a combination thereof.

11. The method according to claim 1 wherein step i) is carried out in the presence of one or more additional components selected from the group of polytetrafluorethylene, polyurea polymers and ureaformaldehyde condensates.

12. A wax particle obtained by carrying out the method according to claim 1 wherein the amount of inorganic component ranges from 1 to 5% by volume, based on the volume of the obtained wax particle, which inorganic component is homogeneously distributed in the wax wherein the density of the wax particle thus obtained ranges from 1.0 to 1.4 g/cm$^3$.

13. The wax particle according to claim 12, wherein the spacing between the inorganic components in the wax matrix varies between 0.5 and 2.5 μm.

14. A wax particle according to claim 12 wherein the size of the wax particle ranges from 1 to 50 μm.

15. A method for preparing a wax dispersion wherein the wax particle according to claim 12 is ground in the presence of one or more components selected from the group consisting of water, resins, solvents, cosolvents and additives so as to form the wax dispersion.

* * * * *